United States Patent [19]

Owen, Jr.

[11] 4,198,490

[45] Apr. 15, 1980

[54] POLYURETHANE FOAMS FROM POLYOL REACTION PRODUCTS OF N-α-ALKYLOLS WITH POLYOLS

[75] Inventor: Gwilym E. Owen, Jr., Granville, Ohio

[73] Assignee: Owens-Corning Fiberglas Corporation, Toledo, Ohio

[21] Appl. No.: 841,094

[22] Filed: Oct. 11, 1977

Related U.S. Application Data

[62] Division of Ser. No. 742,811, Nov. 18, 1976, abandoned.

[51] Int. Cl.$^2$ .................... C08G 18/14; C08G 18/54
[52] U.S. Cl. ................................ 521/166; 521/164; 521/165
[58] Field of Search ............... 260/2.5 AM, 77.5 AM, 260/77.5 AQ; 521/164, 166

[56] References Cited

U.S. PATENT DOCUMENTS

| | | | |
|---|---|---|---|
| Re. 29,118 | 1/1977 | Stamberger | 260/2.5 BE |
| 2,715,619 | 8/1955 | Suen | 528/232 |
| 2,918,452 | 12/1959 | Kun et al. | 528/232 |
| 3,135,707 | 6/1964 | Nyquist | 260/77.5 AQ |
| 3,352,838 | 11/1967 | Toepfl et al. | 260/80.73 |
| 3,530,086 | 9/1970 | Porret et al. | 260/30.2 |
| 3,824,232 | 7/1974 | Pusch et al. | 260/249.6 |
| 3,920,645 | 11/1975 | Schibler et al. | 260/249.5 |
| 3,996,226 | 12/1976 | Savostianoff et al. | 260/249.6 |
| 4,014,857 | 3/1977 | Schmoyer | 260/67.6 R |
| 4,031,040 | 6/1977 | Den Otter | 260/77.5 AM |
| 4,057,519 | 11/1977 | Summers | 260/2.5 BE |

*Primary Examiner*—H. S. Cockeram
*Attorney, Agent, or Firm*—Ronald C. Hudgens; Philip R. Cloutier; James B. Wilkens

[57] ABSTRACT

Polyols produced by the reaction of an N-α-alkylol compound and at least one hydroxyl-containing compound are disclosed. These polyols are particularly suitable for use in the production of polyurethane foams.

2 Claims, No Drawings

POLYURETHANE FOAMS FROM POLYOL REACTION PRODUCTS OF N-α-ALKYLOLS WITH POLYOLS

This is a division of application Ser. No. 742,811, filed Nov. 18, 1976, and now abandoned.

This invention relates to polyurethane foams. More specifically, this invention relates to polyols useful in the production of polyurethane foams and to the method of producing those polyols.

Polyol preparation by oxyalkylation employing certain NH-containing compounds is well known in the art. However, all NH-containing compounds suitable for use in the production of polyols are not readily susceptible to oxyalkylation. U.S. Pat. No. 3,399,151 teaches that 1,3,5-triazines can be sufficiently oxyalkylated to form polyols only if the oxyalkylation reaction is conducted employing a lower dialkyl-substituted sulfoxide and a basic catalyst.

The present invention provides a method for producing polyols which method is especially suitable for producing polyols from NH-containing compounds that are not readily susceptible to oxyalkylation. The polyols of this invention are produced by a method which does not involve the use of an alkylene oxide.

According to this invention, there is provided a method for producing polyols from NH-containing compounds which method comprises reacting an N-α-alkylol compound with at least one hydroxyl-containing compound.

The present invention also provides polyols produced by reacting an N-α-alkylol compound with at least one hydroxyl-containing compound.

Also, according to this invention there are provided polyurethane foams produced from the reaction of an isocyanate and a polyol, the polyol being produced by reacting an N-α-alkylol compound with at least one hydroxyl-containing compound.

For the purpose of this invention, "hydroxyl-containing compound" is understood to mean polyhydroxyl-containing compounds, including dihydroxyl-containing compounds, and mixtures of polyhydroxyl-containing compounds and mono-functional hydroxyl-containing compounds.

N-α-alkylol compounds employable to produce polyols of this invention comprise the reaction products of NH-containing compounds and aldehydes or ketones and are well known in the art.

Taken together, "Amino Resins" by Gustave Widmer, volume 2, *Encyclopedia of Polymer Science and Technology*, pp 1-92, 1965 edition and Chapters IV and V of *Chemical Aftertreatment of Textiles*, N. Mark, Wooding and Atlas, 1971 edition, teach the production of N-α-alkylol compounds suitable for use in this invention.

Specifically, the above-identified references teach that NH-containing compounds employable to produce N-α-alkylol compounds and, accordingly, suitable for use in the production of polyols of this invention include carboxylic acid amides, carbamates, ureas, aminotriazines, sulfamide, sulfonic acid amides, cyanamide, dicyandiamide, guanidines, hydantoins and dihydrouracils.

A particularly suitable N-α-alkylol compound for use in this invention is trimethylolmelamine.

Generally, any hydroxyl-containing compound which can be employed to produce polyester resins is suitable for use in the production of polyols of this invention. For the purpose of reducing functionality and avoiding gelling of the polyols of this invention, it may be desirable to include some monofunctional hydroxyl-containing compound, e.g. alcohol, in mixture with the hydroxyl-containing compounds of this invention.

A particularly suitable hydroxyl-containing compound for use in this invention is propylene glycol.

In the production of the polyols of this invention, the ratio of hydroxyl-containing compound to N-α-alkylol compound can be varied within a wide range. The ratio can be within the range of from about 2 to about 12.5 moles of hydroxyl-containing compound per mole of N-α-alkylol. Preferably, the mole ratio will be within the range of from about 4 to about 8 moles of hydroxyl-containing compound per mole of N-α-alkylol.

The mixing procedure described below represents a typical method of preparing a polyol of this invention. The preparation of the N-α-alkylol compound will be described, although available by the methods of production set forth in the above-identified references.

The total quantities of an NH-containing compound and an aldehyde or ketone are added to a reactor at room temperature with stirring. The contents of the reactor are adjusted to a pH range of from about 3 to about 12 with any suitable base, e.g. triethylamine, sodium hydroxide or potassium hydroxide. The resulting mixture is heated to a temperature within the range of from about 40° C. to about 60° C. The contents of the reactor are permitted to cool to room temperature and are recoverable as an N-α-alkylol compound suitable for use in the invention.

The total quantity of hydroxyl-containing compound is added to the reactor containing the N-α-alkylol compound at room temperature with stirring. The contents of the reactor are heated to a temperature within the range of from about 35° to about 45° C. and vacuum or azeotropic distillation is started. Distillation is continued, with increase in temperature as required until the residual water content is less than 0.2%.

Having described the basic concepts of the invention, reference is now made to the following examples which are provided by way of illustration, not limitation, and demonstrate the best mode of preparing polyols and polyurethane foams of the invention.

EXAMPLE I

This example demonstrates the preparation of an N-α-alkylol compound especially suitable for use in the production of polyols of this invention. The following ingredients were employed:

| Ingredients | Moles |
|---|---|
| melamine | 2 |
| formaldehyde (37% solution) | 14.6 |

The total quantity of melamine was added to the reactor at room temperature. The total quantity of formaldehyde was adjusted to a pH of 9 with triethylamine and added to the reactor containing the melamine with stirring at room temperature. The resulting mixture was swept with nitrogen and heated to a temperature of about 46° C. Heating was discontinued and the temperature of the mixture permitted to rise to about 56° C. The resulting N-α-alkylol compound was permitted to cool to room temperature and was recovered as trimethylolmelamine.

EXAMPLE II

This example demonstrates the preparation of a polyol of the invention. The following ingredients were employed:

| Ingredients | Moles |
|---|---|
| N-α-alkylol compound of Example I | 2.0 |
| propylene glycol | 15.8 |

The total quantity of N-α-alkylol compound was added to a reactor at room temperature. The total quantity of propylene glycol, and an azeotropic solvent, xylene, were added to the reactor containing the N-α-alkylol compound under nitrogen sweep, with stirring at room temperature. The resulting mixture was heated and azeotropic distillation was started. Distillation was continued until the residual water content of the mixture was about 0.1% by weight. The resulting compound was recovered as a polyol of the invention and was determined to have a hydroxyl number of 737.

EXAMPLE III

This example demonstrates the preparation of a polyurethane foam using the polyol of Example II. The following ingredients were employed:

| Ingredients | Parts |
|---|---|
| polyol of Example II | 30.0 |
| OCF polyol RE-300 | 30.5 |
| Pyrol 6 | 9.8 |
| F-11B | 27.6 |
| L-5420 surfactant | 1.4 |
| dimethylethylamine | 0.7 |
| Mondur MR | 100.0 |

The total quantities of all of the above ingredients, except the Mondur MR, were mixed in a reactor at room temperature with stirring. Next, the total quantity of the Mondur MR was added to the reactor contents while vigorously stirring with a high speed stirrer. Stirring was continued for about 15 seconds. The resulting product, a prefoam, was immediately poured into a mold and allowed to rise fully. The resulting product was recovered as a rigid polyurethane foam bun.

The rigid polyurethane foam bun produced was determined to have a density of 1.63 lbs./ft.$^3$ (ASTM D-1622-63), a humid aging volume change of 3.72% after one day (ASTM D-2126-66 procedure F), a dry heat aging volume change of 1.78% after one day (ASTM D-2126-66 procedure E) and Butler Chimney Test values (*Journal of Cellular Plastics,* volume 3 [number 11]p. 497 [1967 ]) as follows:
  burn zone: D+
  % weight retention: 63.5
  time to extinction: 3.8 seconds.

OCF's polyol RE-300 is a resole-based polyol and is described in U.S. Pat. No. 3,770,671.

Fyrol 6 is a phosphonate ester having the following structure:

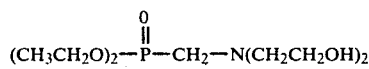

Fyrol 6 is commercially available from Stauffer Chemical Company, New York, N.Y.

F-11B is a fluorocarbon blowing agent commercially available from Union Carbide Corporation, New York, N.Y.

L-5420 is a reactive silicon-based surfactant having a hydroxyl number of 119 and is commercially available from Union Carbide Corporation, New York, N.Y.

Mondur MR is a polymeric polyarl-polyisocyanate prepared by phosgenation of aniline and formaldehyde in a mineral acid, the polyisocyanate having from about 31.5 to about 32% active —NCO groups and a viscosity of about 200 cps. at 25° C. Mondur MR is commercially available from Mobay Chemical Company, Pittsburgh, Pa.

It will be evident from the foregoing that various changes and modifications can be made in the details of procedure, formulation and use without departing from the spirit of the invention, especially as defined in the following claims.

What is claimed is:

1. A polyurethane foam comprising the reaction product of an isocyanate and a polyol produced by reacting an N-α-alkylol compound with from about 2 to about 12.5 moles, per mole of said N-α-alkylol compound, of a polyhydroxyl-containing compound said N-α-alkylol compound being trimethylolmelamine and said hydroxyl-containing compound being propylene glycol.

2. The polyurethane foam of claim 1 in which said hydroxyl-containing compound is employed within a range of from about 4 to about 8 moles per mole of said N-α-alkylol compound.